United States Patent
Bayon-Molino et al.

(10) Patent No.: US 10,469,570 B2
(45) Date of Patent: Nov. 5, 2019

(54) TECHNOLOGIES FOR EXECUTION ACCELERATION IN HETEROGENEOUS ENVIRONMENTS

(71) Applicant: Intel Corporation, Santa Clara, CA (US)

(72) Inventors: Victor Bayon-Molino, Maynooth (IE); Giovani Estrada, Dublin (IE)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 14/998,308

(22) Filed: Dec. 26, 2015

(65) Prior Publication Data

US 2017/0187791 A1 Jun. 29, 2017

(51) Int. Cl.
*H04L 12/24* (2006.01)
*H04L 29/08* (2006.01)

(52) U.S. Cl.
CPC ...... *H04L 67/1008* (2013.01); *H04L 41/0806* (2013.01)

(58) Field of Classification Search
CPC ......... H04L 12/00; H04L 12/12; H04L 41/00; H04L 41/04; H04L 41/08–0823; H04L 41/085–0853; H04L 41/0866; H04L 41/0876–0886; H04L 41/0893; H04L 41/14–20; H04L 41/50; H04L 41/5041; H04L 41/5054; H04L 41/508–5096; H04L 47/00; H04L 47/70; H04L 47/76; H04L 47/765; H04L 47/78; H04L 47/788; H04L 47/82–823; H04L 67/00; H04L 67/10–1004; H04L 67/1008; H04L 67/1029
See application file for complete search history.

(56) References Cited

U.S. PATENT DOCUMENTS

| | | | |
|---|---|---|---|
| 8,631,411 B1 * | 1/2014 | Ghose | G06F 1/206 361/676 |
| 9,733,986 B2 * | 8/2017 | Sasaki | G06F 9/5094 |
| 9,874,924 B1 * | 1/2018 | Li | G06F 1/3287 |
| 9,882,969 B2 * | 1/2018 | Reddy | H04L 67/10 |
| 2007/0258465 A1 | 11/2007 | Ma et al. | |

(Continued)

OTHER PUBLICATIONS

Phelps—How Do Virtual Servers Work—2014.*

(Continued)

*Primary Examiner* — Tauqir Hussain
*Assistant Examiner* — Boris D Grijalva Lobos
(74) *Attorney, Agent, or Firm* — Barnes & Thornburg LLP

(57) ABSTRACT

Technologies for provisioning jobs to servers at a datacenter include a compute device to identify a class of each of a plurality of available servers in the datacenter, wherein the class is indicative of a set of hardware included on the corresponding server. The compute device selects a workload that includes a plurality of jobs to provision to a subset of the available servers and determines a provisioning configuration for the workload from a set of prospective configurations as a function of a rack utilization of each prospective configuration, the classes utilized by each prospective configuration, and a number of racks utilized by each prospective configuration. The provisioning configuration identifies a subset of the available servers to which to provision the jobs of the workload.

21 Claims, 5 Drawing Sheets

(56) References Cited

U.S. PATENT DOCUMENTS

| | | | | |
|---|---|---|---|---|
| 2009/0187775 | A1* | 7/2009 | Ishikawa | G06F 1/3203 713/310 |
| 2009/0276095 | A1 | 11/2009 | Pienta et al. | |
| 2010/0103837 | A1* | 4/2010 | Jungck | H04L 29/12066 370/252 |
| 2011/0077795 | A1 | 3/2011 | Vangilder et al. | |
| 2012/0204051 | A1* | 8/2012 | Murakami | G06F 9/5088 713/324 |
| 2013/0290498 | A1 | 10/2013 | Macauley | |
| 2013/0290540 | A1 | 10/2013 | Ciocci et al. | |
| 2015/0185794 | A1* | 7/2015 | Garden | G06F 1/206 713/323 |
| 2016/0378551 | A1* | 12/2016 | Vaidya | G06F 9/4893 718/105 |

OTHER PUBLICATIONS

MIT—Setting Memory Limits for All Virtual Machines—2006.*
"Druid. A Real-time Analytical Data Store" downloaded from http://static.druid.io/docs/druid.pdf.
"Making Sense of Performance in Data Analytics Frameworks" downloaded from https://www.eecs.berkeley.edu/~keo/publications/nsdi15-final147.pdf.
"Intel Crafts Broadwell Xeon D for Hyperscale" downloaded from http://www.theplatform.net/2015/03/09/intel-crafts-broadwell-xeon-d-for-hyperscale.
"Data Center Servers Suck—But Nobody Knows How Much" downloaded from http://www.wired.com/2012/10/data-center-servers.
"Brawny cores still beat wimpy cores, most of the time" downloaded from http://research.google.com/pubs/archive/36448.pdf.
"CPI2: CPU performance isolation for shared compute clusters" downloaded from http://static.googleusercontent.com/media/research.google.com/en//pubs/archive/40737.pdf.
"Apache Hadoop NextGen MapReduce (YARN)" downloaded from http://hadoop.apache.org/docs/current/hadoop-yarn/hadoop-yarn-site/YARN.html.
"Apache Hadoop YARN—Concepts and Applications" downloaded from http://hortonworks.com/blog/apache-hadoop-yarn-concepts-and-applications.
"Hadoop: Capacity Scheduler" downloaded from https://hadoop.apache.org/docs/current/hadoop-yarn/hadoop-yarn-site/CapacityScheduler.html.
https://hadoop.apache.org/docs/r2.4.1/hadoop-yarn/hadoop-yarn-common/yarn-default.xml.
"Optimization techniques within the Hadoop eco-system. A survey" downloaded from http://home.deib.polimi.it/ardagna/presentation/MapReduceMICAS2014.pdf.
"Proposal: Software Auto-Tuning for MapReduce" downloaded from http://www.dcs.gla.ac.uk/~jsinger/googleprop.pdf.
"I/O in Virtualized Many-Core Servers. How much I/O in 10 Years & How to get there" downloaded from http://www.iolanes.eu/_docs/vtdc12_io_bilas_19jun12.pdf.
CPU Scheduling—Outline downloade from http://www.ittc.ku.edu/~kulkarni/teaching/EECS678/slides/chap6.pdf.
"HiBench Suite. The bigdata micro benchmark suite" downloaded from https://github.com/intel-hadoop/HiBench.
"Serenity. Building the Modules" downloaded from https://github.com/mesosphere/serenity.
"Mesos oversubscription architecture" downloaded from https://docs.google.com/document/d/1pUnE1xHy1uWfHY_FOvvRC73QaOGgdXE0OXN-gbxdXA0/edit.
"Scalability! But at what Cost?" downloaded from https://www.usenix.org/system/files/conference/hotos15/hotos15-paper-mcsherry.pdf.
"The Google stack" downloaded from http://malteschwarzkopf.de/research/assets/google-stack.pdf.
"Run parallel processes on homogeneous hosts" downloaded from https://www-01.ibm.com/support/knowledgecenter/SSETD4_9.1.3/lsf_admin/parallel_processes_homogeneous_hosts.dita.
"Platform LSF, Version 9 Release 1.1" downloaded from https://support.sas.com/rnd/scalability/platform/PSS8.1/lsf9.1_users_guide.pdf.
"Fenzo: OSS Scheduler for Apache Mesos Frameworks" downloaded from http://techblog.netflix.com/2015/08/fenzo-oss-scheduler-for-apache-mesos.html.
"Software architecture" downloaded from http://www.deep-project.eu/deep-project/EN/Software/_node.html.
"Heracles: Improving Resource Efficiency at Scale" downloaded from http://csl.stanford.edu/~christos/publications/2015.heracles.isca.pdf.
"Building a Better . . . Hadoop Cluster" downloaded from http://www.theplatform.net/2015/07/03/building-a-better-hadoop-cluster.
"Docker containers as Apache YARN containers" downloaded from http://blog.sequenceiq.com/blog/2015/01/07/yarn-containers-docker/.
"Docker Container Executor" downloaded from http://hadoop.apache.org/docs/stable/hadoop-yarn/hadoop-yarn-site/DockerContainerExecutor.html.
International search report for PCT application No. PCT/US2016/063593, dated Mar. 13, 2017 (4 pages).
Written opinion for PCT application No. PCT/US2016/063593, dated Mar. 13, 2017 (7 pages).

* cited by examiner

TECHNOLOGIES FOR EXECUTION ACCELERATION IN HETEROGENEOUS ENVIRONMENTS

BACKGROUND

High performance computing (HPC) and "big data" analytics generally involve the use of multiple servers in a datacenter to compute data faster and more efficiently than possible with standalone computing devices. However, typical "big data" and other high-throughput applications often require intimate knowledge of the execution environment, fine-tuning, and/or a static environment. Generally, workloads consisting of many jobs/tasks are provisioned to various computing resources (e.g., rack-based servers), which may be homogenous computing environments consisting, for example, only a particular class of servers or may be heterogeneous computing environments consisting of any number of different classes (e.g., different architectures and/or server generations) of servers. In some systems, virtualization and/or cloud abstraction layers may present heterogeneous infrastructures as homogeneous infrastructures but, in doing so, may exact significant allocation inefficiencies.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
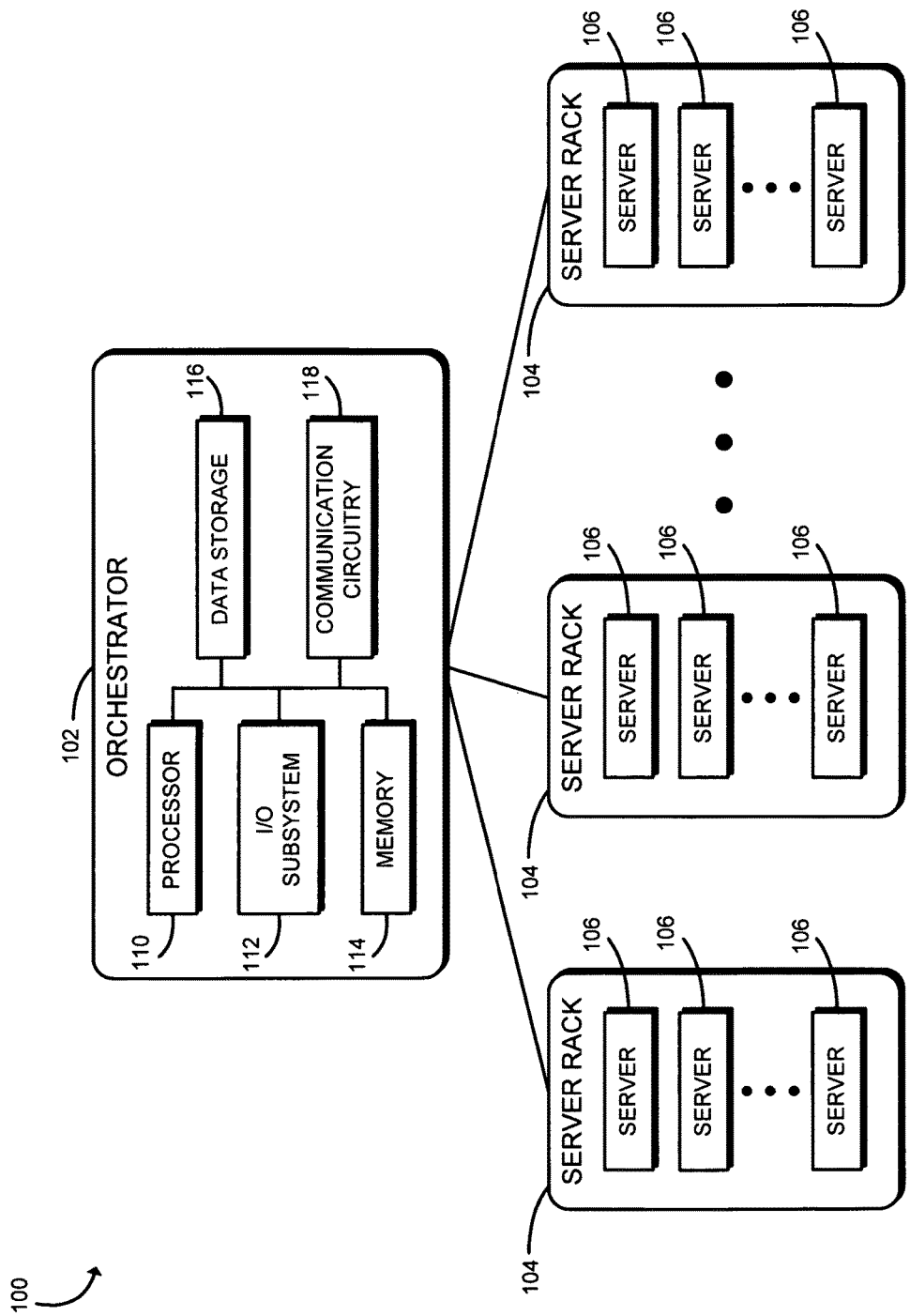
FIG. 1 is a simplified block diagram of at least one embodiment of a system for execution acceleration in heterogeneous environments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for execution acceleration in heterogeneous environments includes an orchestrator 102 and one or more server racks 104. Additionally, in the illustrative embodiment of FIG. 1, each of the server racks 104 may include one or more servers 106. Although only one orchestrator 102 is illustratively shown in FIG. 1, the system 100 may include any number of orchestrators 102 in other embodiments (e.g., a distributed orchestration system). It should be appreciated that, in some embodiments, the system 100 may, be embodied as a datacenter having a plurality of servers 106, for example, arranged into server racks 104 or other server groupings.

As described in detail below, in the illustrative embodiment, the orchestrator 102 computes a provisioning score that may be used for the selection of hosts (i.e., for job provisioning). For example, in some embodiments, the provisioning score may minimize/reduce the difference between the best server 106 performance and the worst server 106 performance, which may be critical to the scheduling of map/reduce, array, and/or HPC jobs. In the illustrative embodiment, the provisioning score is utilized to identify a set of similar servers 106 for job deployment/provisioning across a minimal number of racks that maximizes server utilization of the servers 106 within the utilized server racks 104. It should be appreciated that by prioritizing job placements within a heterogeneous infrastructure, the workload may run in a more predictable way and provide improved performance guarantees while maximizing datacenter rack utilization.

The orchestrator 102 may be embodied as any type of computing device capable of performing the functions described herein. For example, the orchestrator 102 may be embodied as a server, a rack-mounted server, a blade server, a desktop computer, laptop computer, tablet computer, notebook, netbook, Ultrabook™, cellular phone, smartphone, personal digital assistant, mobile Internet device, wearable computing device, Hybrid device, and/or any other compute/communication device. It should be appreciated that the illustrative orchestrator 102 is configured to handle the assignment/provisioning of workloads/jobs (e.g., map/reduce and array jobs) to the appropriate servers 106 in the system 100 (e.g., within the corresponding datacenter).

As shown in FIG. 1, the illustrative orchestrator 102 includes a processor 110, an input/output ("I/O") subsystem 112, a memory 114, a data storage 116, and a communication circuitry 118. Of course, the orchestrator 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the orchestrator 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the orchestrator 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the orchestrator 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the orchestrator 102 as described herein. For example, in some embodiments, the data storage 116 may store a provisioning policy 312 that identifies one or more provisioning configuration preferences as described below.

The communication circuitry 118 may be embodied as any communication circuit, device, or collection thereof, capable of enabling communications between the orchestrator 102 and other remote devices over a network. The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication. Additionally, in the illustrative embodiment, the communication circuitry 118 may include any communication circuit, device, or collection thereof, to enable the orchestrator 102 to communicate with each of servers 106 in the system 100 (e.g., via one or more communication links).

Each of the server racks 104 may be embodied as any device capable of organizing a subset of the servers 106 in the system 100 into a group. In the illustrative embodiment, each server rack 104 includes a chassis, enclosure, or housing having a plurality of slots/bays in which each of those slots/bays is adapted to receive a corresponding server 106 (or remain as an open slot/bay) as shown in the illustrative rack server 202 of FIG. 2. Further, in some embodiments, the slots/bays may be configured to receive servers 106 of different sizes (e.g., corresponding with different classes of servers 106). In other embodiments, it should be appreciated that one or more of the server racks 104 may be configured to group a subset of servers 106 together without physically receiving the servers 106 by a chassis, enclosure, or housing.

Each of the servers 106 may be embodied as any type of computing device capable of performing the functions described herein. For example, in some embodiments, each of the servers 106 may be embodied as a server, rack-mounted server, blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. Further, the servers 106 may include components similar to those of the orchestrator 102 discussed above. The description of those components of the orchestrator 102 is equally applicable to the description of components of the servers 106 and is not repeated herein for clarity of the description. Further, it should be appreciated that the one or more of the servers 106 may include other components, sub-components, and devices commonly found in a computing device, which are not discussed above in reference to the orchestrator 102 and not discussed herein for clarity of the description. In some embodiments, one or more of the components of the orchestrator 102 may be omitted from one or more of the servers 106.

It should be appreciated that, throughout the lifetime of a datacenter (e.g., the system 100), new servers 106 are added and old servers 106 are decommissioned. Rather than shuffling servers 106 throughout the datacenter any time there is an addition of another server 106 to the system 100, old and new server generations (and therefore classes) frequently coexist within a particular server rack 104. Accordingly, a server rack 104 having a homogenous architecture may evolve into a heterogeneous architecture over time due to the replacement of servers 106 in the rack 104. For example, the illustrative server rack 202 of FIG. 2 includes seven servers 106 from three different classes. As described in greater detail below, the class of a server 106 is indicative of a set of particular hardware included on the corresponding server 106. For example, servers 106 having different chipsets, different hardware generations, and/or otherwise of a different type may have different classes depending on the particular embodiment. In particular, by way of example, Intel® Xeon Nahalem EP, Intel® Xeon Ivy Bridge EP, Intel® Xeon E5-4603, and Intel® Xeon E5-2450 servers have different classes relative to one another.

Figure 2:
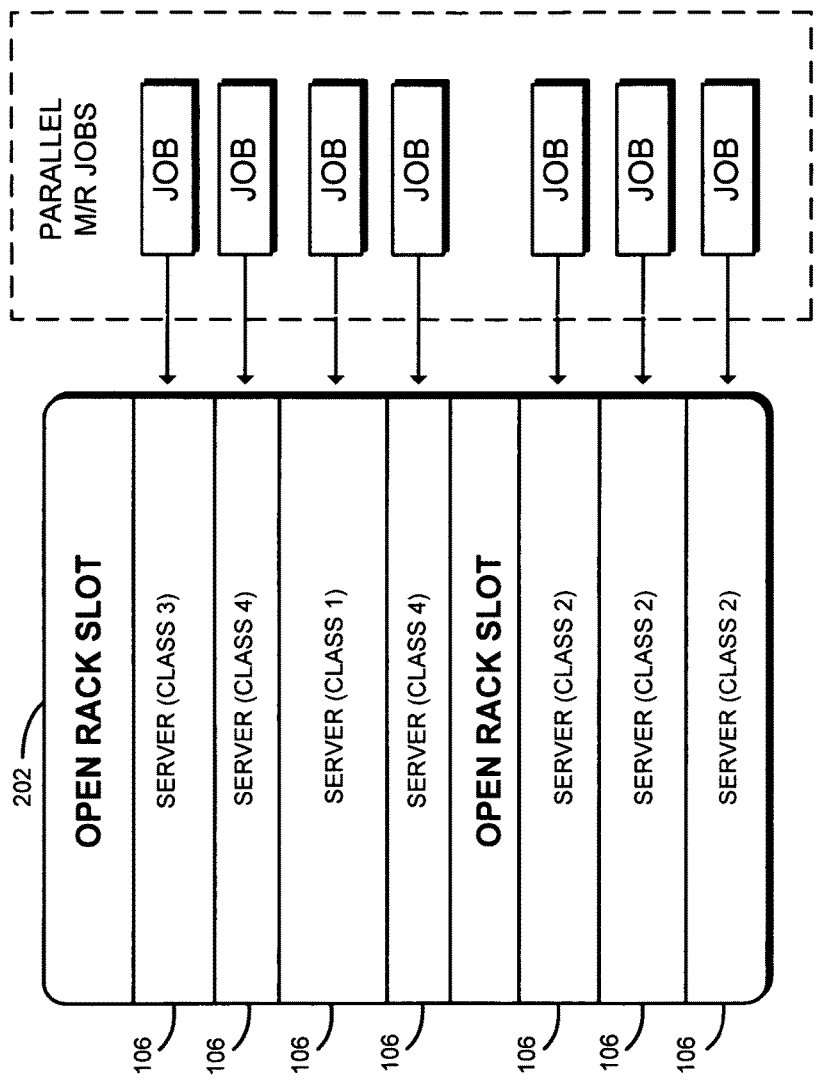
FIG. 2 is a simplified block diagram of at least one embodiment of provisioning jobs to a heterogeneous server rack.

As shown in FIG. 2, the server rack 202 includes two open rack slots, one server 206 having a first class (class 1), three servers 206 having a second class (class 2), one server 206 having a third class (class 3), and two servers 206 having a fourth class (class 4). In the illustrative embodiment, the classes of servers 106 are defined such that a lower-numbered class has a slower processing speed than a higher-numbered class (e.g., class 1 is slower than class 2). As shown of FIG. 2, by way of a simplified illustration, seven jobs (e.g., parallel map/reduce jobs) are provisioned to the servers 106 of the server rack 202, one job to each of the servers 106. It should be appreciated that, assuming the workloads are homogeneous (and therefore require the same amount of processing), the class 1 server will process the job slower than the class 2 server and each of the other higher-class servers. As such, the "slowest" class of servers 106 in a particular rack 104 may most significantly influence the overall latency of the rack 104. Further, in actual deployment, the number of servers 106 included in a server rack 104 and/or the number of jobs provisioned to the servers 106 at a given time may be much greater in number.

Figure 3:
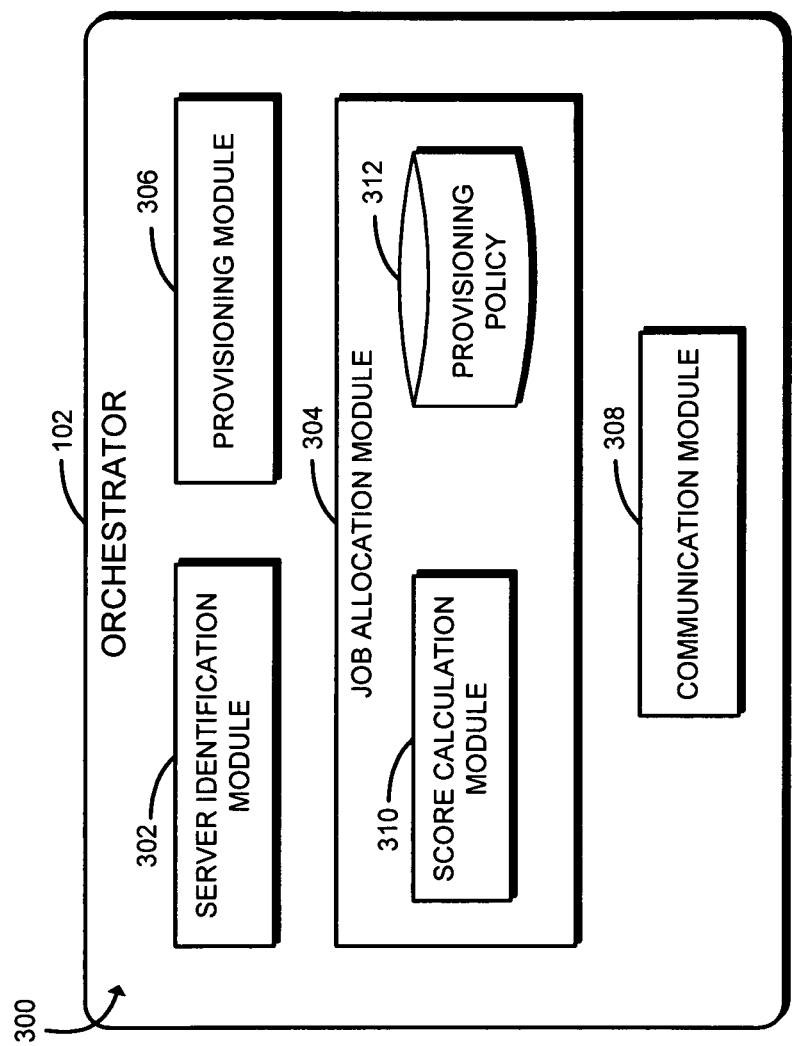
FIG. 3 is a simplified block diagram of at least one embodiment of an environment of an orchestrator of the system of FIG. 1.

Referring now to FIG. 3, in use, the orchestrator 102 establishes an environment 300 for execution acceleration in heterogeneous environments. The illustrative environment 300 includes a server identification module 302, a job allocation module 304, a provisioning module 306, and a communication module 308. Additionally, the illustrative job allocation module 304 includes a score calculation module 310. The various modules of the environment 300 may be embodied as hardware, software, firmware, or a combination thereof. For example, the various modules, logic, and other components of the environment 300 may form a portion of, or otherwise be established by, the processor 110 or other hardware components of the orchestrator 102. As such, in some embodiments, one or more of the modules of the environment 300 may be embodied as circuitry or collection of electrical devices (e.g., a server identification circuitry 302, a job allocation circuitry 304, a provisioning circuitry 306, a communication circuitry 308, and/or a score calculation circuitry 310). It should be appreciated that, in such embodiments, one or more of the server identification circuitry 302, the job allocation circuitry 304, the provisioning circuitry 306, the communication circuitry 308, and/or the score calculation circuitry 310 may form a portion of one or more of the processor 110, the I/O subsystem 112, and/or other components of the orchestrator 102. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 110 or other components of the orchestrator 102.

The server identification module 302, which may be embodied as hardware, firmware, software, virtualized hardware, emulated architecture, and/or a combination thereof as discussed above, is configured to determine various information related to the servers 106 and the server racks 104 included in the system 100. For example, in the illustrative embodiment, the server identification module 302 determines which servers 106 are included on each of the server racks 104 and identifies the class of each of those servers 106. As indicated above, the class of a server 106 is indicative of the hardware (e.g., chipset) included on the server 106. It should be appreciated that the particular hardware components considered in distinguishing between the various classes of servers 106 may vary depending on the particular embodiment. Further, the number of classes of servers 106 included in a particular server rack 104 may also vary. In some embodiments, the server identification module 302 organizes each of the server racks 104 of the system 100 based on the server classes of the servers 106 in each of the respective racks 104. For example, in an embodiment, the server identification module 302 may determine the system 100 consists of sixty servers 106 organized into a first rack 104 that includes twenty servers 106 of a first class, a second rack 104 that includes ten servers 106 of a first class and ten servers 106 of a second class, and a third rack 104 that includes twenty servers 106 of a third class.

The job allocation module 304, which may be embodied as hardware, firmware, software, virtualized hardware, emulated architecture, and/or a combination thereof as discussed above, is configured to deploy/provision workloads that include a plurality of jobs (e.g., map/reduce or array jobs) to the servers 106 of the system 100. In doing so, the job allocation module 304 may select a workload available for provisioning and identify a provisioning configuration that defines the servers 106 to which each of the workload jobs are to be provisioned. In the illustrative embodiment, the provisioning configuration identifies the subset of the servers 106 to which the jobs are to be provisioned. That is, in some embodiments, the provisioning configuration may identify the corresponding server 106 to which each of the jobs is to be deployed. As described in greater detail below, the job allocation module 304 may determine the provisioning configuration by selecting the configuration from a set of prospective configurations based on, or as a function of, a rack utilization of each prospective configuration, the classes of servers 106 utilized by each prospective configuration, and/or a number of racks utilized by each prospective configuration. In doing so, the job allocation module 304 may utilize the provisioning policy 312, which may identify various rules and/or preferences for selecting the appropriate configuration, and/or a provisioning score calculated by the score calculation module 310 for each of the prospective configurations.

The score calculation module 310, which may be embodied as hardware, firmware, software, virtualized hardware, emulated architecture, and/or a combination thereof as discussed above, determines a provisioning score for one or more prospective provisioning configurations (e.g., each possible configuration). In particular, in the illustrative embodiment, the score calculation module 310 may determine the provisioning score according to $$s_i = (1/r)\Sigma(n/a),$$

wherein s is the provisioning score, i is an index that identifies the corresponding prospective configuration, r is a number of racks involved in the corresponding prospective configuration, n is a number of servers 106 involved in the corresponding prospective configuration, and a is a number of available servers 106 to which a job could be provisioned. In the illustrative embodiment, the score calculation module 310 only considers the servers 106 that have enough capacity to run one or more of the particular jobs of the workload (e.g., enough processor utilization and/or memory capacity). Further, it should be appreciated that the orchestrator 102 and/or the provisioning policy 312 may define an order among the various server classes (e.g., that class 2 is better than class 1, etc.). In the illustrative embodiment, the provisioning score incorporates a rack utilization ratio defined according to (n/a) and penalizes jobs spreading across multiple racks 104 (e.g., by virtue of the (1/r) term). As described below, the provisioning scores may be compared in order to select a prospective configuration as the configuration to use for provisioning (e.g., the configuration associated with the greatest provisioning score). It should be appreciated that, in some embodiments, the score calculation module 310 of the job allocation module 304 may be separately embodied as hardware, firmware, software, virtualized hardware, emulated architecture, and/or a combination thereof The provisioning policy 312 may define various rules and/or preferences associated with selecting the provisioning configuration. For example, in some embodiments, the provisioning policy 312 may define rules or principles to be used as "tie breakers" in circumstances in which multiple configurations have the same "best" provisioning score. Of course, in some embodiments, the rules or principles may be utilized prior to the calculation of the provisioning score, for example, to filter a subset of prospective configurations from a larger set of prospective configurations under consideration such that the provisioning configuration is selected from one of the configurations in the filtered subset. For example, in some embodiments, the provisioning policy 312 may indicate to select the prospective configuration that utilizes the fewest racks and/or that has the greater rack utilization in response to a determination that multiple prospective configurations have the best provisioning score. Further, in some embodiments, the provisioning policy 312 may indicate that the jobs should be provisioned to servers 106 of the same class if possible.

The provisioning module 306, which may be embodied as hardware, firmware, software, virtualized hardware, emulated architecture, and/or a combination thereof as discussed above, is configured to provision the jobs of the workload to the appropriate servers 106. For example, in the illustrative embodiment, the provisioning module provisions the jobs to the subset of available servers 106 identified by the provisioning configuration as described herein.

The communication module 308, which may be embodied as hardware, firmware, software, virtualized hardware, emulated architecture, and/or a combination thereof as discussed above, handles the communication between the orchestrator 102 and other computing devices of the system 100 (e.g., the servers 106). For example, as described herein, the orchestrator 102 is configured to deploy various jobs of a workload to servers 106 selected based on the techniques described herein.

Figure 4:
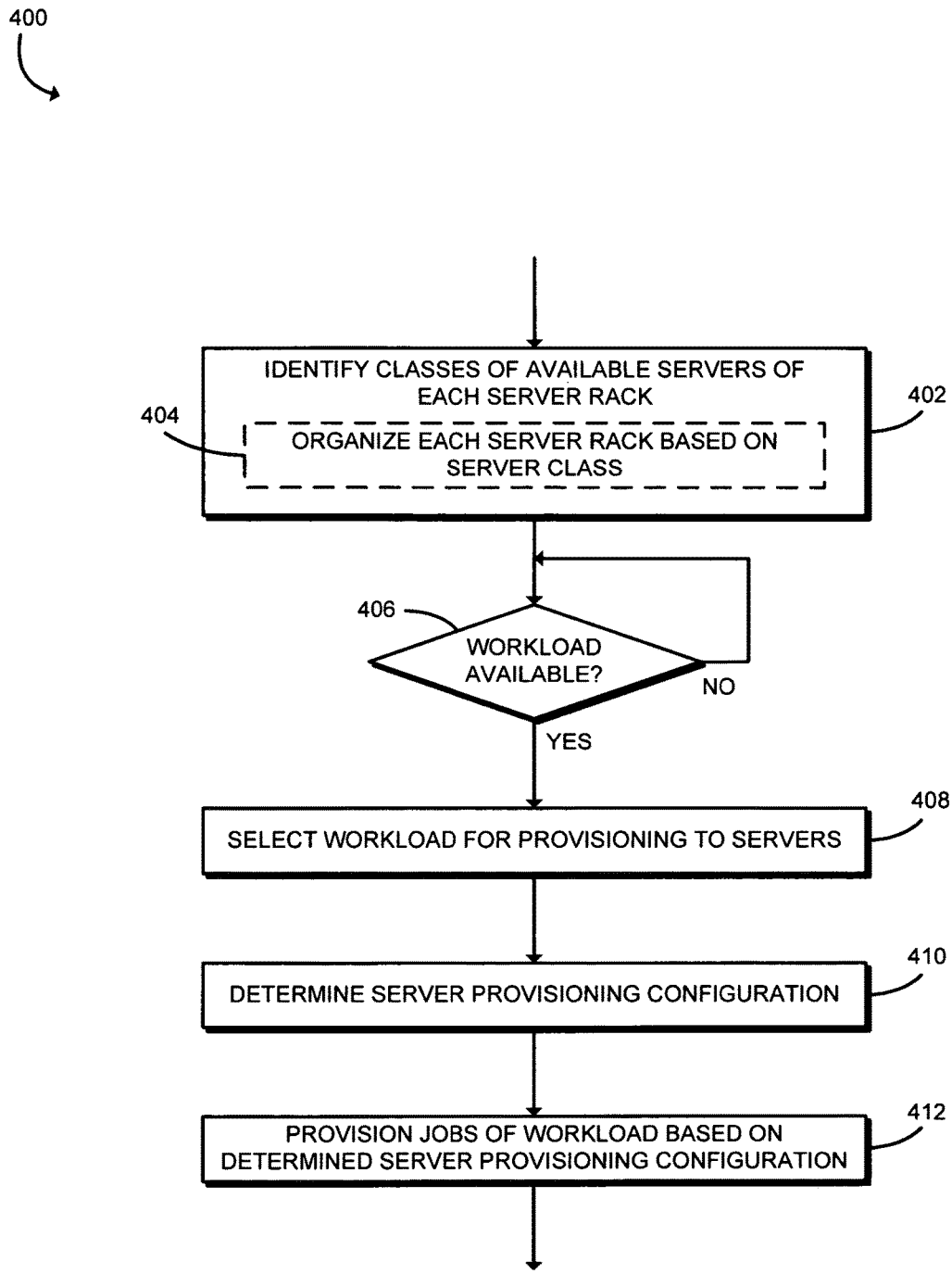
FIG. 4 is a simplified flow diagram of at least one embodiment of a method for provisioning jobs to servers in a datacenter.

Referring now to FIG. 4, in use, the orchestrator 102 may execute a method 400 for provisioning jobs to servers 106, for example, in a datacenter. The illustrative method 400 begins with block 402 in which the orchestrator 102 identifies the classes of the available servers 106 of each of the servers 106. In doing so, in block 404, the orchestrator 102 may organize each of the server racks 104 based on the class(es) of the servers 106 in the corresponding server rack 104 or otherwise determine how many servers 106 belong to each class for each of the racks 104. For example, in an embodiment described above, the orchestrator 102 may determine that the system 100 consists of sixty servers 104 organized into a first rack 104 that includes twenty servers 106 of a first class, a second rack 104 that includes ten servers 106 of a first class and ten servers 106 of a second class, and a third rack 104 that includes twenty servers 106 of a third class.

In block 406, the orchestrator 102 determines whether a workload is available for provisioning/deployment to the servers 106. If the orchestrator 102 determines that at least one workload is available for provisioning, the orchestrator 102 selects one of the workloads (e.g., assuming there are multiple workloads in the queue) for provisioning to the servers 106 in block 408. It should be appreciated that the orchestrator 102 may select the workload to provision based on any suitable techniques and/or algorithms, for example, for workload priority management. In block 410, the orchestrator 102 determines the server provisioning configuration. To do so, in some embodiments, the orchestrator 102 may execute a method 500 described below in reference to FIG. 5. In block 412, the orchestrator 102 provisions the jobs of the selected workload based on the determined server provisioning configuration.

Figure 5:
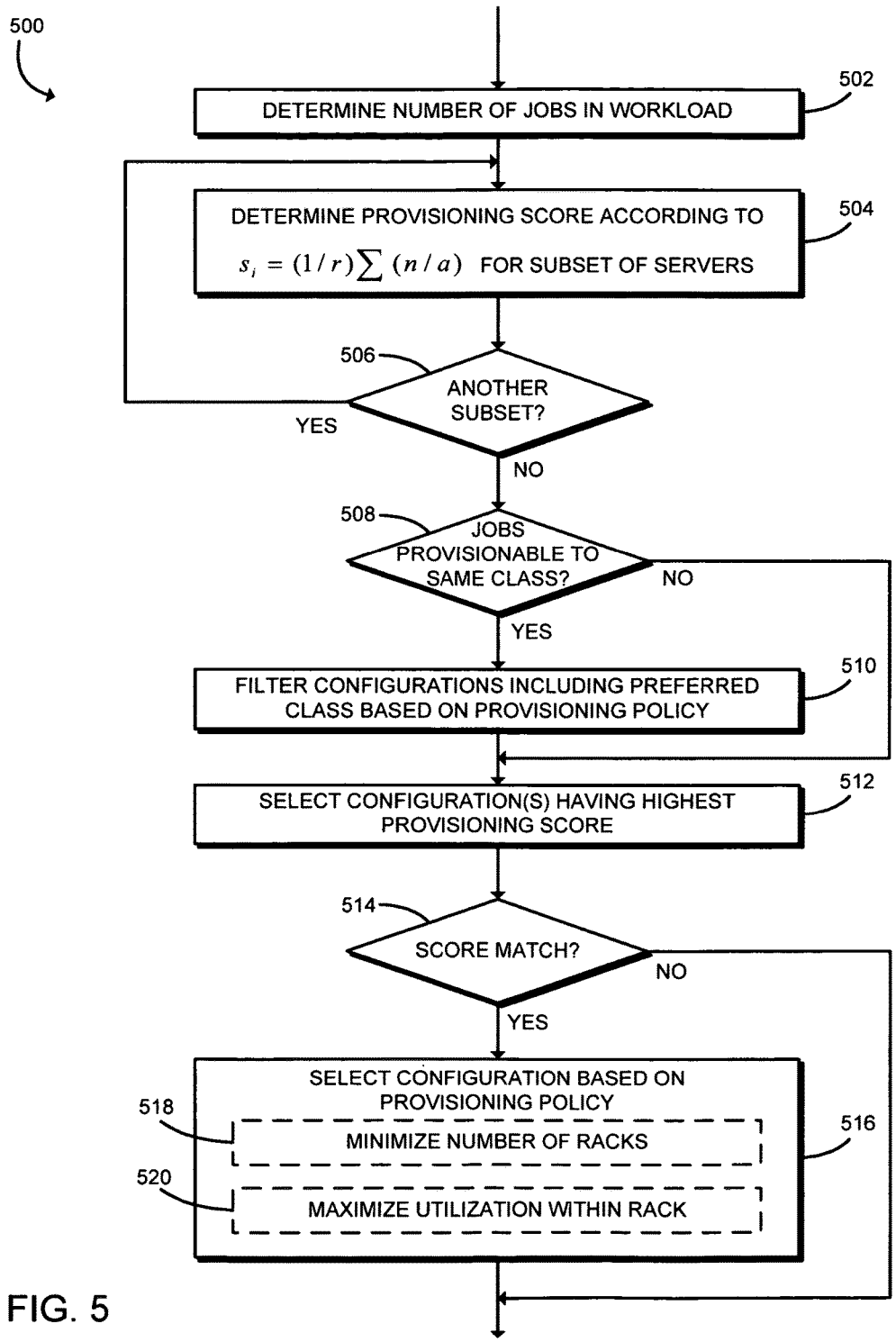
FIG. 5 is a simplified flow diagram of at least one embodiment of a method for determining a server provisioning configuration.

Referring now to FIG. 5, in use, the orchestrator 102 may execute the method 500 for determining the server provisioning configuration. The illustrative method 500 begins with block 502 in which the orchestrator 102 determines the number of jobs, n, included in the workload. In block 504, the orchestrator 102 determines a provisioning score for a subset of servers 106. In particular, in some embodiments, the orchestrator 102 determines the provisioning score for the subset according to $$s_i = (1/r)\Sigma(n/a),$$

wherein s is the provisioning score, i is an index that identifies the corresponding prospective configuration, r is a number of racks involved in the corresponding prospective configuration, n is a number of servers 106 involved in the corresponding prospective configuration, and a is a number of available servers 106 to which a job could be provisioned. As indicated above, it should be appreciated that the provisioning score incorporates a rack utilization ratio defined by (n/a) and penalizes jobs spreading across multiple racks 104 (e.g., by virtue of the (1/r) term). In block 506, the orchestrator 102 determines whether to determine the provisioning score for another subset (e.g., for another provisioning configuration). If so, the method 500 selects another subset and returns to block 504 to determine the provisioning score for that subset.

Otherwise, the method 500 proceeds to block 508 in which the orchestrator 102 determines whether all of the jobs of the workload are provisionable to the same class of servers 106 in the system 100. If not, the orchestrator 102 selects the provisioning configuration(s) having the highest provisioning score in block 510. Returning to block 408, if the orchestrator 102 determines that the jobs are all provisionable to the same class (e.g., due to lack of servers 106 having that class, lack of processing/memory capacity of the servers 106 of that class, etc.), the orchestrator 102 filters the prospective configurations having a preferred class based on the provisioning policy 312 in block 512, and the provisioning configuration is selected from the filtered set of prospective configurations in block 510. It should be appreciated that the provisioning policy 312 may define the preferred class in any suitable way depending on the particular embodiment. For example, in the illustrative embodiment, the provisioning policy 312 indicates that less efficient classes have priority/preference over more efficient classes (e.g., class 1 has the highest priority, class 2 has priority over class 3, class 3 has priority over class 4, etc.). As indicated above, in other embodiments, the provisioning policy 312 may be applied to filter the prospective configurations as described above only if there are multiple configurations having the best (e.g., highest) provisioning score. Further, in some embodiments, the prospective configurations may only be filtered according to the rules described above if all of the jobs may be deployed to servers 106 of the highest priority of class of the available servers 106 (e.g., only if all of the jobs may be deployed to servers 106 of the slowest server class).

In some embodiments, it should be appreciated that multiple provisioning configurations may have the same provisioning score. Accordingly, in block 514, the orchestrator 102 determines whether there are multiple configurations having the highest and, therefore, matching provisioning score. If so, in the illustrative embodiment, the orchestrator 102 applies the rules of the provisioning policy 312 to identify the configuration to select for provisioning. That is, in block 516, the orchestrator 102 selects the provisioning configuration based on the provisioning policy 312. It should be appreciated that the particular provisioning rules of the provisioning policy 312 may vary depending on the particular embodiment and may be applied in any suitable order to identify the appropriate provisioning configuration. For example, in block 518, the orchestrator 102 may select the configuration that minimizes or utilizes a fewer number of server racks 104 (e.g., to minimize network overhead from inter-rack communication). Further, in block 520, the orchestrator 102 may select the configuration that maximizes server platform utilization within the racks 104. In some embodiments, the provisioning policy 312 may further identify a procedure by which to select the configuration if the application of the defined rules does not result in a clear choice for the configuration (e.g., by random selection).

By way of example, suppose the orchestrator 102 were to provision a sequence of three workloads to the servers 106 of the system 100 described above in which the system 100 consists of sixty servers 104 organized into a first rack 104 that includes twenty servers 106 of a first class, a second rack 104 that includes ten servers 106 of a first class and ten servers 106 of a second class, and a third rack 104 that includes twenty servers 106 of a third class based on the techniques described herein (e.g., based on the method 500). In such an example, suppose the first workload includes five jobs, the second workload includes fifteen jobs, and the third workload includes eleven jobs.

For the first workload, the orchestrator 102 may determine that there are enough servers 106 of the first class (twenty in the first rack 104 and ten in the second rack 104) to provision all of the jobs of the workload to servers 106 of the first class such that it is unnecessary to utilize the higher-class servers 106. Accordingly, the orchestrator 102 may calculate the provisioning formula, $s_i=(1/r)\Sigma(n/a)$, described above for the relevant server subsets/configurations. In particular, the provisioning scores may be calculated to be $s_1=(1/1)(5/20)=0.2$ and $s_2=(1/1)(5/10)=0.5$, where $s_1$ is the score associated with provisioning the jobs to the first class servers 106 of the first rack 104 and $s_2$ is the score associated with provisioning the jobs to the first class servers 106 of the second rack 104. In the illustrative embodiment, the orchestrator 102 selects the configuration having the greatest/maximum provisioning score (i.e., $s_2$), so the orchestrator 102 determines to provision the jobs to the first class servers 106 of the second rack 104. It should be appreciated that by assigning the workload to a single rack 104, inter-process communication and HPC jobs (e.g., OpenMP/MPI and CUDA) may run faster and with less network overhead (e.g., due to the servers 106 in the rack 104 generally being wired through the same network device).

After deployment of the first workload, it should be appreciated that the system 100 now has fifty-five available servers 106 grouped into a first rack 104 that includes twenty servers 106 of a first class, a second rack 104 that includes five servers 106 of a first class and ten servers 106 of a second class, and a third rack 104 that includes twenty servers 106 of a third class. For the second workload (fifteen jobs), the orchestrator 102 again determines that there are enough servers 106 of the first class (twenty in the first rack 104 and five in the second rack 104) to fulfill the workload request by provisioning all of the jobs to servers 106 of the first class. As such, the orchestrator 102 calculates the relevant provisioning scores to be $s_1=(1/1)(15/20)=0.7$ and $s_2=(1/2)(5/5+10/20)=0.7$, where $s_1$ is the score associated with provisioning all of the jobs to the first class servers 106 of the first rack 104 and $s_2$ is the score associated with provisioning five of the jobs to the available first class servers 106 of the second rack 104 and the remaining ten jobs to the first class servers 106 of the first rack 104. Because the provisioning scores are equal, the orchestrator 102 applies the rules of the provisioning policy 312 in the illustrative embodiment. In particular, the orchestrator 102 selects the configuration that minimizes the number of racks 104 used for the deployment and, therefore, provisions all fifteen of the jobs to the first class servers 106 of the first rack 104.

After deployment of the second workload, it should be appreciated that the system 100 now has forty available servers 106 from a first rack 104 that includes five servers 106 of a first class, a second rack 104 that includes five servers 106 of a first class and ten servers 106 of a second class, and a third rack 104 that includes twenty servers 106 of a third class. For the third workload (eleven jobs), the orchestrator 102 determines that there are too few servers 106 of the first class to provision all of the jobs to servers 106 of the first class and, therefore, must assign at least one job to a server 106 of a higher class (e.g., class 2). Accordingly, the orchestrator 102 calculates the relevant provisioning scores to be $s_1=(1/3)(5/5+5/5+1/10)=0.7$ and $s_2=(1/3)(5/5+5/5+1/20)=0.6$, where $s_1$ is the score associated with provisioning five of the jobs to the available first class servers 106 of the first rack 104, five of the jobs to the available first class servers 106 of the second rack 104, and the last job to a second class server of the second rack 104 and $s_2$ is the score associated with provisioning five of the jobs to the available first class servers 106 of the first rack 104, five of the jobs to the available first class servers 106 of the second rack 104, and the last job to a third class server 106 of the third rack 104. In the illustrative embodiment, the orchestrator 102 selects the configuration having the greatest/maximum provisioning score (i.e., $s_1$) and, therefore, determines to provision five of the jobs to the available first class servers 106 of the first rack 104, five of the jobs to the available first class servers 106 of the second rack 104, and the last job to a second class server of the second rack 104. It should be appreciated that the illustrative example described herein represents the application of one embodiment of the provisioning policy 312 and the techniques described herein are, therefore, not so limited.

EXAMPLES

Illustrative examples of the technologies disclosed herein are provided below. An embodiment of the technologies may include any one or more, and any combination of, the examples described below.

Example 1 includes a compute device for provisioning jobs to servers at a datacenter, the compute device comprising a server identification module to identify a class of each of a plurality of available servers in the datacenter, wherein the class is indicative of a set of hardware included on the corresponding server; and a job allocation module to (i) select a workload that includes a plurality of jobs to provision to a subset of the available servers (ii) determine a provisioning configuration for the workload from a set of prospective configurations as a function of a rack utilization of each prospective configuration, the classes utilized by each prospective configuration, and a number of racks utilized by each prospective configuration, wherein the provisioning configuration identifies a subset of the available servers to which to provision the jobs of the workload.

Example 2 includes the subject matter of Example 1, and further including a provisioning module to provision the jobs of the workload to the identified subset of the available servers.

Example 3 includes the subject matter of any of Examples 1 and 2, and wherein the compute device comprises an orchestrator of the datacenter.

Example 4 includes the subject matter of any of Examples 1-3, and where to identify the class of each of the plurality of available servers comprises to organize each server rack associated with the plurality of available servers based on the class of the available servers.

Example 5 includes the subject matter of any of Examples 1-4, and wherein to determine the provisioning configuration comprises to determine a provisioning score for each prospective configuration of the set of prospective configuration.

Example 6 includes the subject matter of any of Examples 1-5, and wherein to determine the provisioning score for each prospective configuration comprises to determine the provisioning score according to $$s_i = (1/r)\Sigma(n/a),$$

wherein s is the provisioning score, i is an index that identifies the corresponding prospective configuration, r is a number of racks involved in the corresponding prospective configuration, n is a number of servers involved in the corresponding prospective configuration, and a is a number of available servers.

Example 7 includes the subject matter of any of Examples 1-6, and wherein to determine the provisioning configuration comprises to select the prospective configuration having a greatest provisioning score as the provisioning configuration.

Example 8 includes the subject matter of any of Examples 1-7, and wherein the job allocation module is further to select a prospective configuration as the provisioning configuration based on a provisioning policy of the compute device in response to a determination that multiple prospective configurations have the greatest provisioning score.

Example 9 includes the subject matter of any of Examples 1-8, and wherein the provisioning policy indicates to select the prospective configuration that utilizes a lesser number of racks in response to a determination that multiple prospective configurations have a matching provisioning score.

Example 10 includes the subject matter of any of Examples 1-9, and wherein the provisioning policy indicates to select the prospective configuration that has a greater rack utilization in response to a determination that the multiple prospective configurations have a matching provisioning score.

Example 11 includes the subject matter of any of Examples 1-10, and wherein to determine the provisioning configuration comprises to determine whether each of the jobs in the workload can be provisioned to available servers having a same class.

Example 12 includes the subject matter of any of Examples 1-11, and wherein to determine the provisioning configuration comprises to select a prospective configuration associated with a least efficient class in response to a determination that each of the jobs in the workload can be provisioned to available servers having the same class for multiple different classes.

Example 13 includes the subject matter of any of Examples 1-12, and wherein the plurality of jobs comprises parallel map/reduce jobs.

Example 14 includes a method for provisioning jobs to servers at a datacenter, the method comprising identifying, by a compute device, a class of each of a plurality of available servers in the datacenter, wherein the class is indicative of a set of hardware included on the corresponding server; selecting, by the compute device, a workload that includes a plurality of jobs to provision to a subset of the available servers; and determining, by the compute device, a provisioning configuration for the workload from a set of prospective configurations as a function of a rack utilization of each prospective configuration, the classes utilized by each prospective configuration, and a number of racks utilized by each prospective configuration, wherein the provisioning configuration identifies a subset of the available servers to which to provision the jobs of the workload.

Example 15 includes the subject matter of Example 14, and further including provisioning, by the compute device, the jobs of the workload to the identified subset of the available servers.

Example 16 includes the subject matter of any of Examples 14 and 15, and wherein the compute device comprises an orchestrator of the datacenter.

Example 17 includes the subject matter of any of Examples 14-16, and where identifying the class of each of the plurality of available servers comprises organizing each server rack associated with the plurality of available servers based on the class of the available servers.

Example 18 includes the subject matter of any of Examples 14-17, and wherein determining the provisioning configuration comprises determining a provisioning score for each prospective configuration of the set of prospective configuration.

Example 19 includes the subject matter of any of Examples 14-18, and wherein determining the provisioning score for each prospective configuration comprises determining the provisioning score according to $$s_i = (1/r)\Sigma(n/a),$$

wherein s is the provisioning score, i is an index that identifies the corresponding prospective configuration, r is a number of racks involved in the corresponding prospective configuration, n is a number of servers involved in the corresponding prospective configuration, and a is a number of available servers.

Example 20 includes the subject matter of any of Examples 14-19, and wherein determining the provisioning configuration comprises selecting the prospective configuration having a greatest provisioning score as the provisioning configuration.

Example 21 includes the subject matter of any of Examples 14-20, and further including selecting, by the compute device, a prospective configuration as the provisioning configuration based on a provisioning policy of the compute device in response to a determination that multiple prospective configurations have the greatest provisioning score.

Example 22 includes the subject matter of any of Examples 14-21, and wherein the provisioning policy indicates to select the prospective configuration that utilizes a lesser number of racks in response to a determination that multiple prospective configurations have a matching provisioning score.

Example 23 includes the subject matter of any of Examples 14-22, and wherein the provisioning policy indicates to select the prospective configuration that has a greater rack utilization in response to a determination that the multiple prospective configurations have a matching provisioning score.

Example 24 includes the subject matter of any of Examples 14-23, and wherein determining the provisioning configuration comprises determining whether each of the jobs in the workload can be provisioned to available servers having a same class.

Example 25 includes the subject matter of any of Examples 14-24, and wherein determining the provisioning configuration comprises selecting a prospective configuration associated with a least efficient class in response to a determination that each of the jobs in the workload can be provisioned to available servers having the same class for multiple different classes.

Example 26 includes the subject matter of any of Examples 14-25, and wherein the plurality of jobs comprises parallel map/reduce jobs.

Example 27 includes a computing device comprising a processor; and a memory having stored therein a plurality of instructions that when executed by the processor cause the computing device to perform the method of any of Examples 14-26.

Example 28 includes one or more machine-readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a compute device for provisioning jobs to servers at a datacenter, the compute device comprising means for identifying a class of each of a plurality of available servers in the datacenter, wherein the class is indicative of a set of hardware included on the corresponding server; means for selecting a workload that includes a plurality of jobs to provision to a subset of the available servers; and means for determining a provisioning configuration for the workload from a set of prospective configurations as a function of a rack utilization of each prospective configuration, the classes utilized by each prospective configuration, and a number of racks utilized by each prospective configuration, wherein the provisioning configuration identifies a subset of the available servers to which to provision the jobs of the workload.

Example 31 includes the subject matter of Example 30, and further including means for provisioning the jobs of the workload to the identified subset of the available servers.

Example 32 includes the subject matter of any of Examples 30 and 31, and wherein the compute device comprises an orchestrator of the datacenter.

Example 33 includes the subject matter of any of Examples 30-32, and where the means for identifying the class of each of the plurality of available servers comprises means for organizing each server rack associated with the plurality of available servers based on the class of the available servers.

Example 34 includes the subject matter of any of Examples 30-33, and wherein the means for determining the provisioning configuration comprises means for determining a provisioning score for each prospective configuration of the set of prospective configuration.

Example 35 includes the subject matter of any of Examples 30-34, and wherein the means for determining the provisioning score for each prospective configuration comprises means for determining the provisioning score according to $$s_i = (1/r)\Sigma(n/a),$$

wherein s is the provisioning score, i is an index that identifies the corresponding prospective configuration, r is a number of racks involved in the corresponding prospective configuration, n is a number of servers involved in the corresponding prospective configuration, and a is a number of available servers.

Example 36 includes the subject matter of any of Examples 30-35, and wherein the means for determining the provisioning configuration comprises means for selecting the prospective configuration having a greatest provisioning score as the provisioning configuration.

Example 37 includes the subject matter of any of Examples 30-36, and further including means for selecting a prospective configuration as the provisioning configuration based on a provisioning policy of the compute device in response to a determination that multiple prospective configurations have the greatest provisioning score.

Example 38 includes the subject matter of any of Examples 30-37, and wherein the provisioning policy indicates to select the prospective configuration that utilizes a lesser number of racks in response to a determination that multiple prospective configurations have a matching provisioning score.

Example 39 includes the subject matter of any of Examples 30-38, and wherein the provisioning policy indicates to select the prospective configuration that has a greater rack utilization in response to a determination that the multiple prospective configurations have a matching provisioning score.

Example 40 includes the subject matter of any of Examples 30-39, and wherein the means for determining the provisioning configuration comprises means for determining whether each of the jobs in the workload can be provisioned to available servers having a same class.

Example 41 includes the subject matter of any of Examples 30-40, and wherein the means for determining the provisioning configuration comprises means for selecting a prospective configuration associated with a least efficient class in response to a determination that each of the jobs in the workload can be provisioned to available servers having the same class for multiple different classes.

Example 42 includes the subject matter of any of Examples 30-41, and wherein the plurality of jobs comprises parallel map/reduce jobs.

The invention claimed is:

1. A compute device for provisioning jobs to servers at a datacenter, the compute device comprising:
   a server identification module to identify a class of each of a plurality of available servers in the datacenter, wherein the class is indicative of a set of hardware included on the corresponding server; and
   a job allocation module to (i) select a workload that includes a plurality of jobs to provision to a subset of the available servers and (ii) determine a provisioning configuration for the workload from a set of prospective configurations as a function of a rack utilization of each prospective configuration, the classes utilized by each prospective configuration, and a number of racks utilized by each prospective configuration, wherein the provisioning configuration identifies a subset of the available servers to which to provision the jobs of the workload and wherein to determine the provisioning configuration comprises to determine a provisioning score for each prospective configuration according to:

$$s_i=(1/r)\Sigma(n/a),$$

wherein s is the provisioning score, i is an index that identifies the corresponding prospective configuration, r is a number of racks involved in the corresponding prospective configuration, n is a number of servers involved in the corresponding prospective configuration, and a is a number of available servers.

2. The compute device of claim 1, further comprising a provisioning module to provision the jobs of the workload to the identified subset of the available servers.

3. The compute device of claim 1, wherein the compute device comprises an orchestrator compute device of the datacenter.

4. The compute device of claim 1, where to identify the class of each of the plurality of available servers comprises to organize each server rack associated with the plurality of available servers based on the class of the available servers.

5. The compute device of claim 1, wherein to determine the provisioning configuration comprises to select the prospective configuration having a greatest provisioning score as the provisioning configuration.

6. The compute device of claim 5, wherein the job allocation module is further to select a prospective configuration as the provisioning configuration based on a provisioning policy of the compute device in response to a determination that multiple prospective configurations have the greatest provisioning score.

7. The compute device of claim 6, wherein the provisioning policy indicates to select the prospective configuration that utilizes a lesser number of racks in response to a determination that multiple prospective configurations have a matching provisioning score.

8. The compute device of claim 6, wherein the provisioning policy indicates to select the prospective configuration that has a greater rack utilization in response to a determination that the multiple prospective configurations have a matching provisioning score.

9. The compute device of claim 1, wherein to determine the provisioning configuration comprises to determine whether each of the jobs in the workload can be provisioned to available servers having a same class.

10. The compute device of claim 9, wherein to determine the provisioning configuration comprises to select a prospective configuration associated with a less energy efficient class in response to a determination that each of the jobs in the workload can be provisioned to available servers having the same class for multiple different classes.

11. One or more machine-readable storage media comprising a plurality of instructions stored thereon that, in response to execution by a compute device, cause the compute device to:
identify a class of each of a plurality of available servers in the datacenter, wherein the class is indicative of a set of hardware included on the corresponding server;
select a workload that includes a plurality of jobs to provision to a subset of the available servers; and
determine a provisioning configuration for the workload from a set of prospective configurations as a function of a rack utilization of each prospective configuration, the classes utilized by each prospective configuration, and a number of racks utilized by each prospective configuration, wherein the provisioning configuration identifies a subset of the available servers to which to provision the jobs of the workload and wherein to determine the provisioning configuration comprises to determine a provisioning score according to $$s_i=(1/r)\Sigma(n/a),$$

wherein s is the provisioning score, i is an index that identifies the corresponding prospective configuration, r is the number of racks involved in the corresponding prospective configuration, n is the number of servers involved in the corresponding prospective configuration, and a is the number of available servers.

12. The one or more machine-readable storage media of claim 11, wherein the plurality of instructions further cause the compute device to provision the jobs of the workload to the identified subset of the available servers.

13. The one or more machine-readable storage media of claim 11, wherein the compute device comprises an orchestrator compute device of the datacenter.

14. The one or more machine-readable storage media of claim 11, wherein to determine the provisioning configuration comprises to select the prospective configuration having a greatest provisioning score as the provisioning configuration.

15. The one or more machine-readable storage media of claim 14, wherein the plurality of instructions further cause the compute device to select a prospective configuration as the provisioning configuration based on a provisioning policy of the compute device in response to a determination that multiple prospective configurations have the greatest provisioning score.

16. The one or more machine-readable storage media of claim 15, wherein the provisioning policy indicates to select the prospective configuration that utilizes a lesser number of racks in response to a determination that multiple prospective configurations have a matching provisioning score.

17. The one or more machine-readable storage media of claim 15, wherein the provisioning policy indicates to select the prospective configuration that has a greater rack utilization in response to a determination that the multiple prospective configurations have a matching provisioning score.

18. A method for provisioning jobs to servers at a datacenter, the method comprising:
identifying, by a compute device, a class of each of a plurality of available servers in the datacenter, wherein the class is indicative of a set of hardware included on the corresponding server;
selecting, by the compute device, a workload that includes a plurality of jobs to provision to a subset of the available servers; and
determining, by the compute device, a provisioning configuration for the workload from a set of prospective configurations as a function of a rack utilization of each prospective configuration, the classes utilized by each prospective configuration, and a number of racks utilized by each prospective configuration, wherein the provisioning configuration identifies a subset of the available servers to which to provision the jobs of the workload and wherein determining the provisioning configuration comprises determining a provisioning score for each prospective configuration according to $$s_i=(1/r)\Sigma(n/a),$$

wherein s is the provisioning score, i is an index that identifies the corresponding prospective configuration, r is the number of racks involved in the corresponding prospective configuration, n is the number of servers involved in the corresponding prospective configuration, and a is the number of available servers.

19. The method of claim 18, wherein determining the provisioning configuration comprises selecting the prospective configuration having a greatest provisioning score as the provisioning configuration.

20. The method of claim 18, wherein determining the provisioning configuration comprises determining whether each of the jobs in the workload can be provisioned to available servers having a same class.

21. The method of claim 20, wherein determining the provisioning configuration comprises selecting a prospective configuration associated with a less energy efficient class in response to a determination that each of the jobs in the workload can be provisioned to available servers having the same class for multiple different classes.

* * * * *